(12) United States Patent
Myszkowski et al.

(10) Patent No.: US 11,491,925 B2
(45) Date of Patent: *Nov. 8, 2022

(54) STORAGE SYSTEM FOR A VEHICLE AND INTERIOR COMPARTMENT OF A VEHICLE HAVING SAME

(71) Applicant: Honda Motor Co., Ltd., Tokyo (JP)

(72) Inventors: Marek Myszkowski, Powell, OH (US); Brian D. Large, Hilliard, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 17/004,898

(22) Filed: Aug. 27, 2020

(65) Prior Publication Data
US 2022/0063517 A1 Mar. 3, 2022

(51) Int. Cl.
*B60R 11/06* (2006.01)
*B60R 7/02* (2006.01)
*B60R 7/08* (2006.01)
*B60R 5/04* (2006.01)

(52) U.S. Cl.
CPC .............. *B60R 11/06* (2013.01); *B60R 5/04* (2013.01); *B60R 7/02* (2013.01); *B60R 7/08* (2013.01)

(58) Field of Classification Search
CPC ..... B60R 7/02; B60R 7/08; B60R 2011/0036; B60R 11/06; B60R 5/04
USPC ....................... 296/37.1, 37.15, 37.16, 37.14
See application file for complete search history.

(56) References Cited

U.S. PATENT DOCUMENTS

| 1,237,750 | A | * | 8/1917 | Chappell | B60R 7/043 296/37.15 |
| 1,544,018 | A | * | 6/1925 | McDonald | B60R 7/043 296/37.15 |
| 1,615,698 | A | * | 1/1927 | Hartzell | F16B 21/02 24/701 |
| 4,750,774 | A | * | 6/1988 | Pickering | B60R 11/06 224/543 |
| 5,716,091 | A | * | 2/1998 | Wieczorek | B60R 7/02 296/37.16 |

(Continued)

FOREIGN PATENT DOCUMENTS

| CN | 203358478 U | 12/2013 | |
| DE | 102007059375 A1 * | 6/2009 | ............... B60R 5/04 |

(Continued)

OTHER PUBLICATIONS

Machine translation of DE-102007059375-A1.*

*Primary Examiner* — D Glenn Dayoan
*Assistant Examiner* — Kevin P Weldon
(74) *Attorney, Agent, or Firm* — Kenealy Vaidya LLP

(57) ABSTRACT

A storage system for a tire repair kit for a vehicle can be located at the front end of a rear cargo space of the vehicle. The storage system can include a front panel and a lid. The front panel can be located at the front end of the rear cargo space and include an outer surface facing the rear cargo space and a storage space recessed from the outer surface. The storage space can be configured to contain the tire repair kit. The lid can be connected to the front panel such that the lid is selectively placed in a closed state and an opened state, the lid conceals the storage space from the rear cargo space when the lid is in the closed state, and the storage space is opened to the rear cargo space when the lid is in opened state.

18 Claims, 13 Drawing Sheets

(56) References Cited

U.S. PATENT DOCUMENTS

| | | | |
|---|---|---|---|
| 6,230,949 B1 * | 5/2001 | O'Connell | B60R 11/06 224/543 |
| 7,526,098 B2 | 4/2009 | Rosental et al. | |
| 8,115,615 B2 | 2/2012 | Miller et al. | |
| 8,308,226 B2 * | 11/2012 | Parkinson | B60R 11/06 296/37.2 |
| 8,727,416 B2 | 5/2014 | Nakazawa | |
| 9,796,316 B1 | 10/2017 | Siqueira et al. | |
| 2013/0062236 A1 * | 3/2013 | Nakazawa | B60R 11/06 206/349 |
| 2015/0251712 A1 * | 9/2015 | Craven | B60R 5/04 296/37.2 |
| 2016/0280151 A1 * | 9/2016 | Engerman | B25H 5/00 |
| 2018/0127031 A1 * | 5/2018 | Ono | B60R 13/013 |
| 2019/0232882 A1 * | 8/2019 | Price | B60R 7/04 |

FOREIGN PATENT DOCUMENTS

| | | | |
|---|---|---|---|
| FR | 3006955 A1 * | 12/2014 | B60N 3/06 |
| FR | 3035629 A1 * | 11/2016 | B60R 11/06 |
| JP | 5185899 B2 | 4/2013 | |
| KR | 19980031346 | 8/1998 | |
| KR | 100466315 B1 | 1/2005 | |
| WO | 2016138972 A1 | 9/2016 | |

* cited by examiner

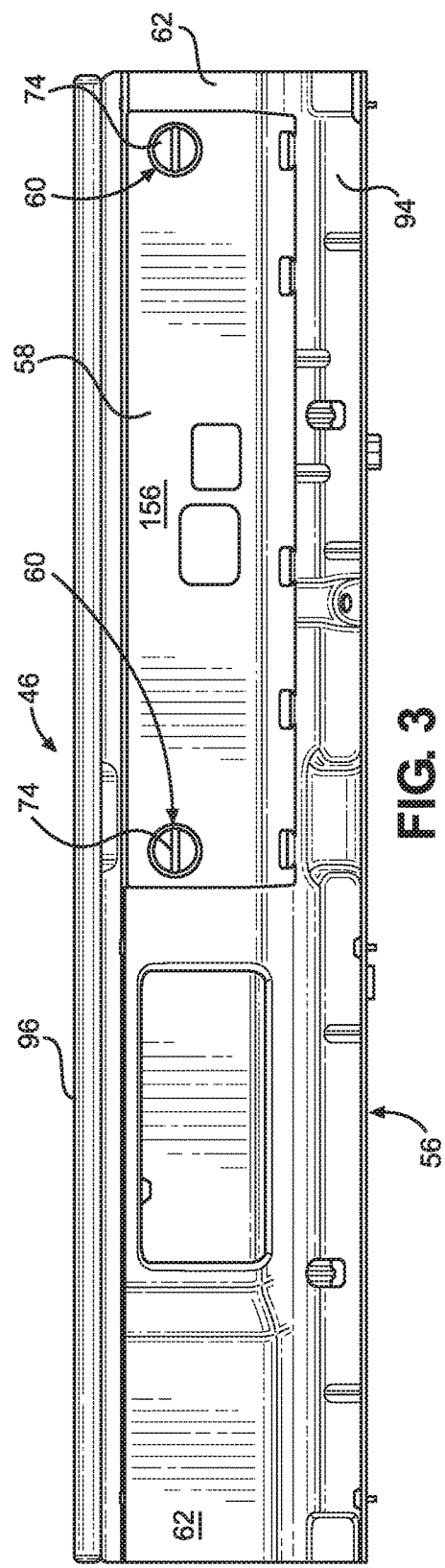

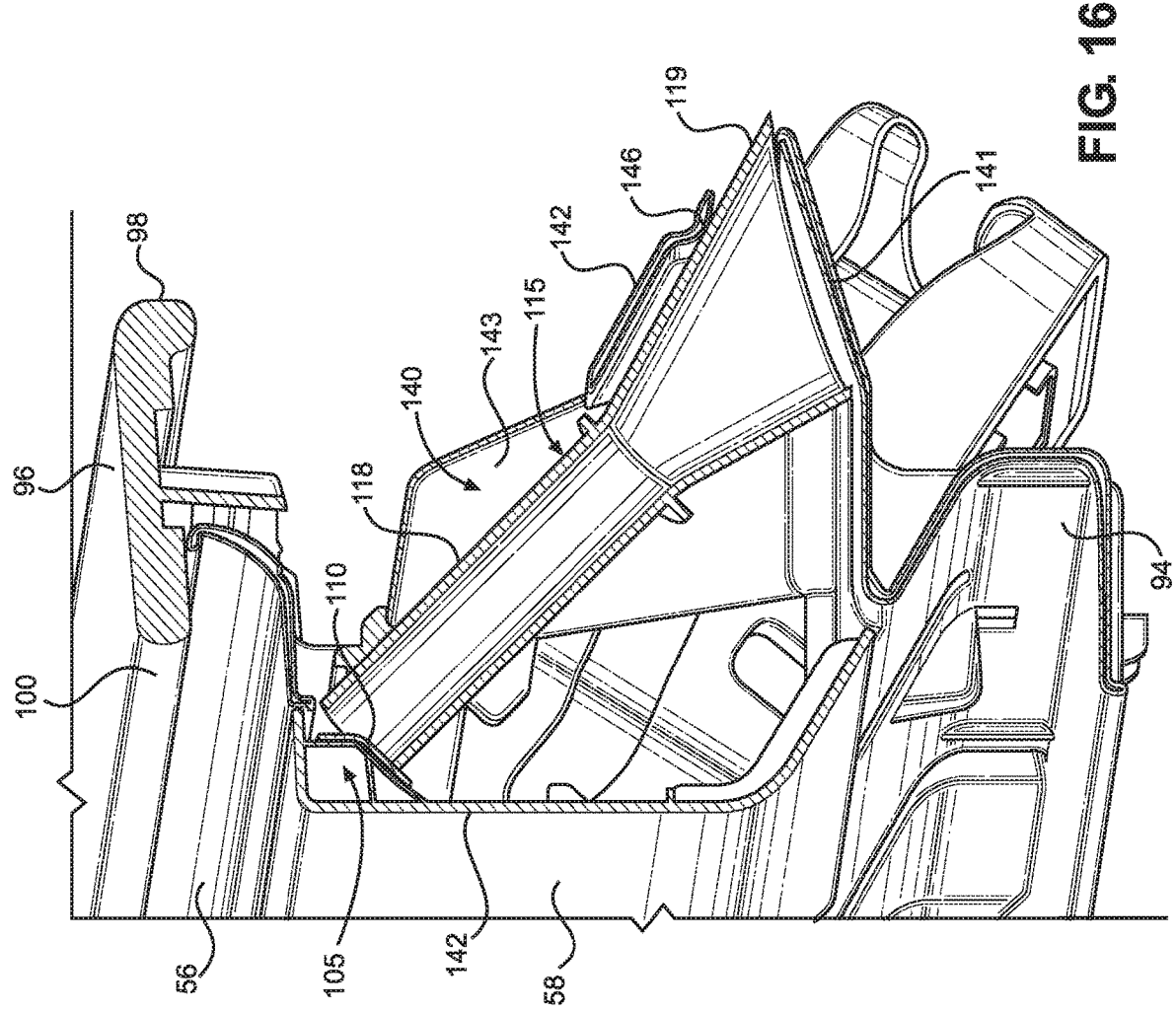

STORAGE SYSTEM FOR A VEHICLE AND INTERIOR COMPARTMENT OF A VEHICLE HAVING SAME

BACKGROUND

The disclosed subject matter relates to a storage system for a vehicle. More particularly, the disclosed subject matter relates to methods and apparatus that can store at least one tool for servicing the vehicle.

Vehicles can include a passenger compartment and one or more storage spaces. The storage space can be external to the passenger space or continuous with the passenger space. Some storage spaces can be concealed compartments within or adjacent to the passenger space that can be accessed within the passenger space.

Straps or other fastening structures can be used to secure items in the storage space. The storage space can include a foam insert that can function as a cushion that reduces noise created by an item rattle around in the storage space.

SUMMARY

Some embodiments are directed to a storage system for a tire repair kit for a vehicle. The vehicle can include a rear cargo space having a front end, a rear end, and an opening at the rear end, and a closure selectively opening and closing the opening. The storage system can include a front panel and a lid. The front panel can be located at the front end of the rear cargo space and include an outer surface facing the rear cargo space and a storage space recessed from the outer surface. The storage space can be configured to contain the tire repair kit. The lid can be connected to the front panel such that the lid is selectively placed in a closed state and an opened state, the lid conceals the storage space from the rear cargo space when the lid is in the closed state, and the storage space is opened to the rear cargo space when the lid is in opened state.

Some embodiments are directed to an interior storage compartment for a vehicle. The interior storage compartment can include a floor, a pair of side walls, a rear wall, a rear cargo space, a front panel, tire repair kit, and a lid. The pair of side walls can extend away from the floor and extend along a longitudinal direction of the vehicle. The side walls can be spaced apart from each other in a transverse direction of the vehicle. The rear wall can be connected to and extend from the side walls and extend along the floor in the transverse direction of the vehicle. The rear cargo space can be formed by the rear wall, the floor and the side walls. The rear cargo space can have a rear end that is bounded by the rear wall and a front end that is spaced away from the rear wall in a longitudinal direction of the vehicle. The front panel can extend along the floor, be located at the front end of the rear cargo space, and include an outer surface and a storage space. The outer surface can face the rear cargo space and be spaced away from the rear wall in the longitudinal direction of the vehicle. The storage space can be recessed from the outer surface. The tire repair kit can include at least one of a bottle, a pump and a funnel contained in the storage space. The lid can be connected to the front panel such that the lid is selectively placed in a closed state and an opened state, the lid conceals the storage space from the rear cargo space when the lid is in the closed state, and the storage space is opened to the rear cargo space when the lid is in opened state.

Some embodiments are directed to an interior compartment for a vehicle that can include a floor, a pair of side walls, a rear wall, a passenger seat, a rear cargo space, a front panel, tire repair kit and a lid. The pair of side walls can extend away from the floor and extend along a longitudinal direction of the vehicle. The side walls can be spaced apart from each other in a transverse direction of the vehicle. The rear wall can be connected to and extend from the side walls and extend along the floor in the transverse direction of the vehicle. The passenger seat can be mounted on the floor and spaced away from the rear wall in the longitudinal direction of the vehicle. The rear cargo space can be formed by the floor, the passenger seat, the rear wall, and the side walls. The rear cargo space can include a front end that is adjacent to the passenger seat and spaced away from the rear wall in the longitudinal direction of the vehicle. The front panel can extend along the floor, be located at the front end of the rear cargo space, and include an outer surface and a storage space. The outer surface can face the rear cargo area and be spaced away from the rear wall in the longitudinal direction of the vehicle. The storage space can be recessed from the outer surface. The tire repair kit can include at least one of a bottle, a pump and a funnel contained in the storage space. The lid can be selectively attachable to and detachable from the front panel such that the lid covers the storage area when the lid is attached to the front panel and the lid exposes the storage area when the lid is detached from the front panel.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is a plan view of the storage system of FIG. 2.

FIG. 4 is a plan view showing components of a tire repair kit secured in the storage space of the storage system of FIG. 3 with the lid removed.

FIG. 16 is a perspective cross-sectional view taken along line 16-16 of FIG. 4.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
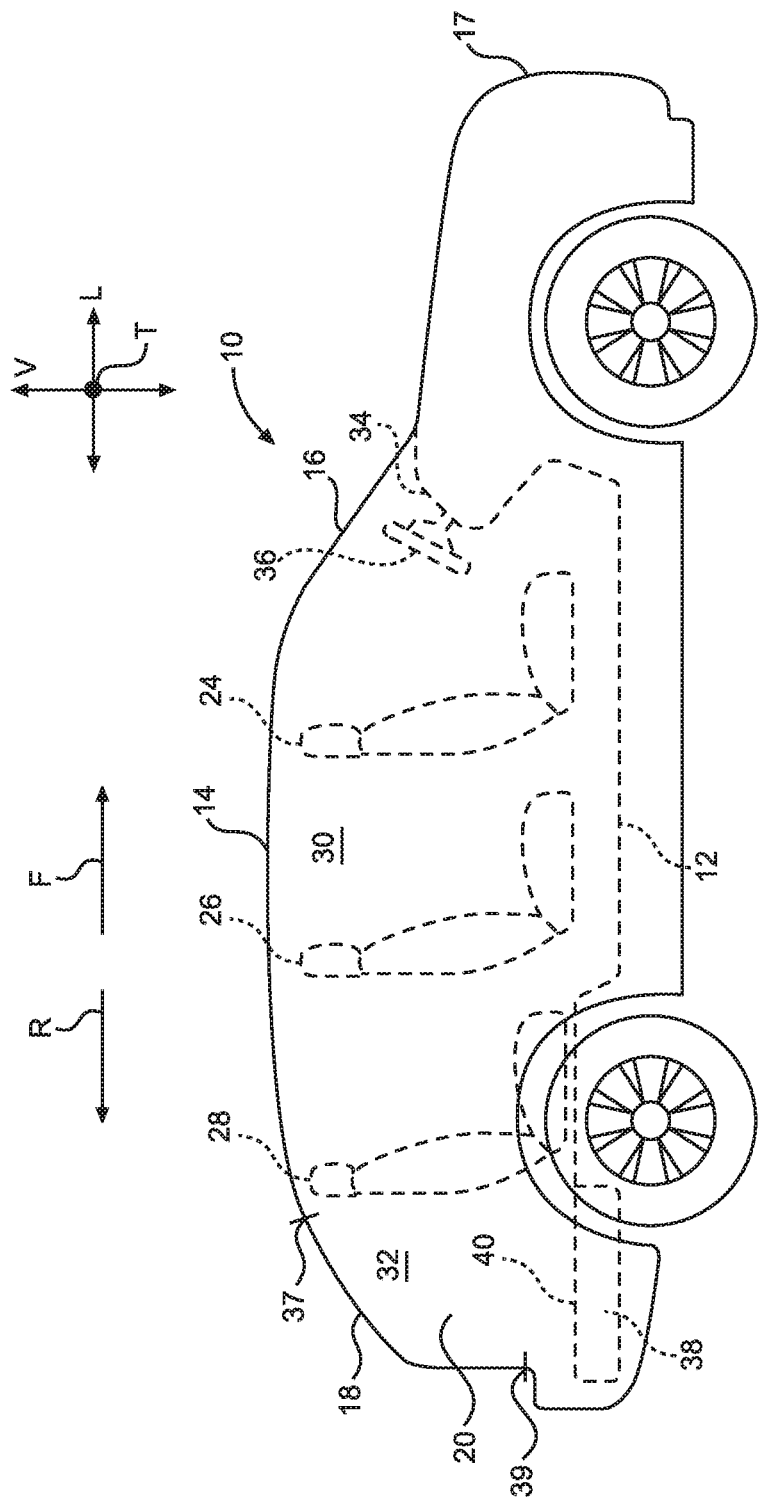
FIG. 1 is a schematically illustrated right side view of a vehicle made in accordance with principles of the disclosed subject matter.
Figure 2:
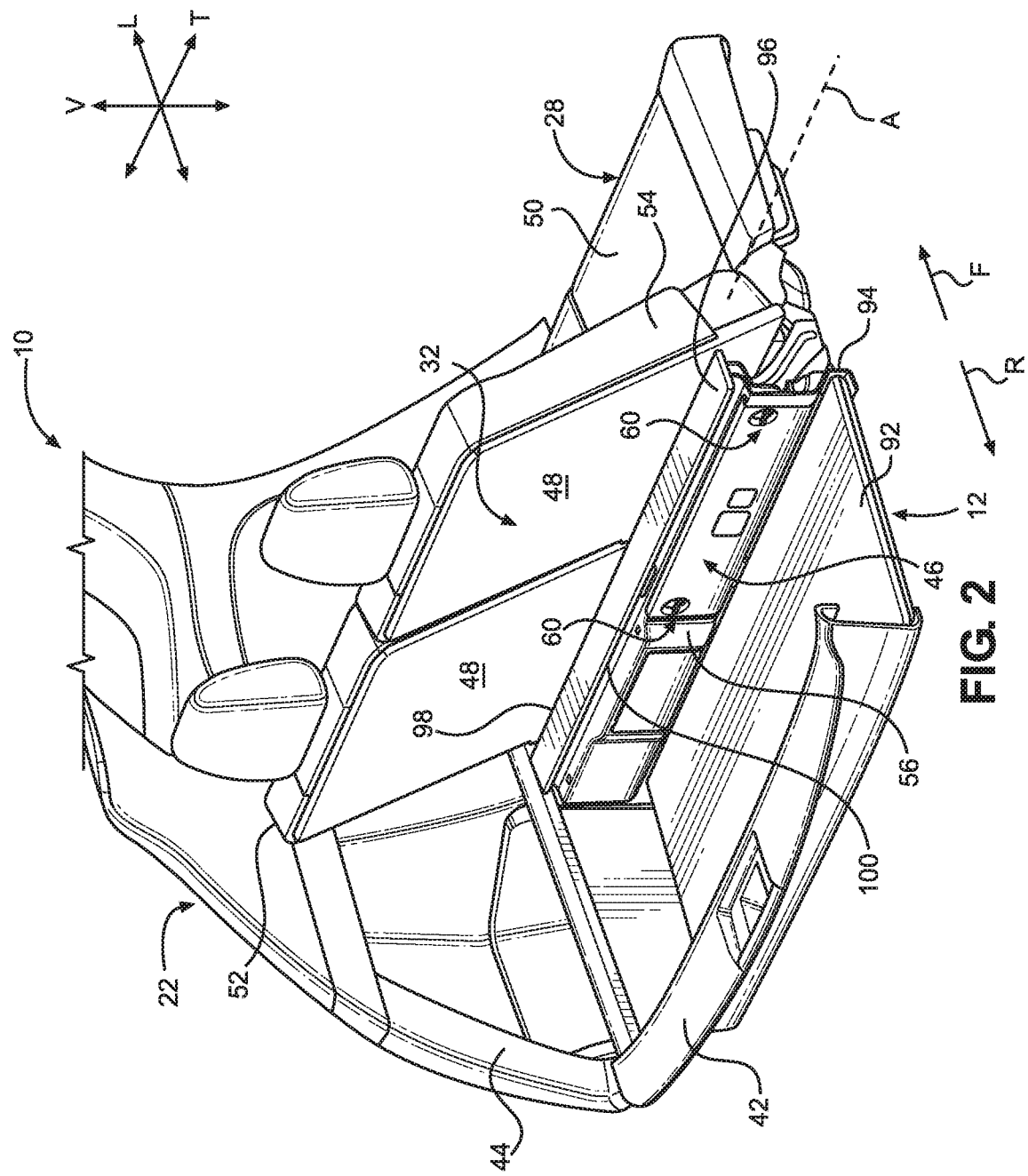
FIG. 2 is a perspective cut-away view of a rear portion of the vehicle of FIG. 1 and including a storage system made in accordance with the principles of the disclosed subject matter.

FIG. 1 schematically illustrates an embodiment of a vehicle made in accordance with principles of the disclosed subject matter. FIG. 2 illustrates a rear portion of the vehicle of FIG. 1. Referring to FIGS. 1 and 2, collectively, the vehicle 10 can include a floor 12, a roof 14, a windshield 16, a front end 17, a rear closure 18, a right side 20, a left side 22. The vehicle 10 extends in a longitudinal direction L between the front end 17 and the rear closure 18. The vehicle 10 extends in a transverse direction T between the right side 20 and the left side 22. The vehicle 10 extends in the vertical direction V between the floor 12 and the roof 14. A viewing direction along the longitudinal direction L that is directed away from the rear closure 18 and toward the front end 17 can be referred to as a forward direction F. A viewing direction along the longitudinal direction L that is directed toward the rear closure 18 and away from the front end 17 can be referred to as a rearward direction R. Accordingly, a portion of a structure of the vehicle 10 that faces or is directed in the forward direction F can be referred to as a front portion, front end or front side. A portion of a structure of the vehicle 10 that faces or is directed in the rearward direction R can be referred to as a rear portion, rear end or rear side.

The vehicle 10 can include a plurality of seating rows 24, 26, 28, a passenger space 30, a rear cargo space 32, an instrument panel 34 and a steering wheel 36.

The passenger space 30 can be a volume that is bounded by the floor 12, the roof 14, the sides 20, 22, the instrument panel 34, and the third seating row 28. The rear cargo space 32 can be a volume that is bounded by the floor 12, the roof 14, the sides 20, 22, the rear closure 18 and the third seating row 28.

The rear closure 18 can be selectively opened and closed to permit access to the rear cargo space 32 via a rear opening in the vehicle 10. The rear closure 18 can be delimited by a top end 37 and a bottom end 39 schematically illustrated in FIG. 1. The rear closure 18 can be referred to as a tailgate or a liftgate. The rear closure 18 is omitted from FIG. 2 to more clearly illustrate the rear cargo space 32.

The rear cargo space 32 can include a front end that is adjacent to the rear-most seating row and a rear end that is bounded by the rear closure 18. FIGS. 1 and 2 show the third seating row 28 as the rear-most seating row. In alternate embodiments, the third seating row 28 can be omitted and the front end of the rear cargo space 32 can be adjacent to the second seating row 26 which serves as the rear-most seating row.

Referring to FIG. 1, the rear cargo space 32 can include a closed compartment 38. The closed compartment 38 can include a movable or removable cover 40 that selectively opens and closes access to the closed compartment 38. The cover 40 can be flush or substantially flush with the floor 12. Alternate embodiments can omit the closed compartment 38, such as illustrated in FIG. 2.

Referring to FIG. 2, the vehicle 10 can include a rear sill trim panel assembly 42 and a left side trim panel assembly 44. Each of the rear sill trim panel assembly 42 and the left side trim panel assembly 44 can include at least one panel and at least one fastener that can attach the respective panel to a structural member of the vehicle 10 such as but not limited to a metal panel of the floor 12 and a metal panel of left side 22.

The vehicle 10 can include a right side trim panel assembly that extends along the right side 20 and along the rear cargo space 32 that is the same as or similar in shape and structure to the left side trim panel assembly 44. For example, the right side trim panel assembly can be a mirror image of the left side trim panel assembly. The right side trim panel assembly is part of the vehicle 10 that has been cut away to create the view in FIG. 2.

The rear opening that is selectively opened and closed by the rear closure 18 can be bounded by the rear sill trim panel assembly 42, the left side trim panel assembly 44, the right side trim panel assembly and a roof trim panel assembly attached to the inside surface of the roof 14.

The vehicle 10 can include one or more tools that can be used to service the vehicle 10. Exemplary tools can include but are not limited to a fuel funnel, a pressurized sealant bottle (also referred to as a bottle), an air pump, a jack assembly, a wheel wrench (also referred to as a lug wrench) and a bar jack. The rear cargo space 32 can provide a convenient location for storing the tool(s). It can be advantageous to store the tool(s) in a concealed compartment within or adjacent to the rear cargo space 32. Concealing the tool(s) can provide secured space for restraining the tool(s) and prevent the tool(s) from coming into contact with other items stored in the rear cargo space 32. The vehicle 10 can include a storage system 46 that is configured to accommodate at least one tool in a concealed compartment. Further, the storage system 46 can be integrated into a decorative trim assembly that can conceal other structures of the vehicle 10 such as but not limited to the rear side 48 of the third seating row 28 or a space underneath the third seating row 28. Further still, the storage system 46 can be configured to secure the tool(s) without the use of straps or other separate fasteners and with a separate foam insert. Thus, the storage system 46 can reduce the part count and assembly time for manufacturing and installation and can simplify securement and removal of the tool(s) from the storage system 46.

The storage system 46 can be located at the front end of the rear cargo space 32. The storage system 46 can be configured to store and conceal at least one of the fuel funnel, pressurized sealant bottle, air pump, jack assembly, wheel wrench and a bar jack. The storage system 46 can extend along the transverse direction T of the vehicle 10 from the left side panel assembly 44 to the right side panel assembly. The storage system 46 can extend along the floor 12 of the vehicle 10. The storage system 46 can be adjacent to or abut a rear side 48 of the third seating row 28.

The third seating row 28 can include a seat bottom 50, a left seat back 52 and a right seat back 54. The seat backs 52, 54 can pivot relative to the seat bottom 50 about pivot axis A. The pivot axis A can extend in the transverse direction T of the vehicle 10. The left seat back 52 can pivot independently of the right seat 54.

The storage system 46 can extend along the front end of the rear cargo space 32 such that the seat backs 52, 54 are located between the storage system 46 and the seat bottom 50.

The storage system 46 can extend along the pivot axis A. The storage system 46 can cover the pivot axis A when viewed in the forward direction F from the rear cargo space 32. The storage system 46 can extend parallel to or substantially parallel to the pivot axis A such that one of ordinary skill would perceive the storage system 46 to be parallel to the pivot axis A.

Referring to FIGS. 2 and 3, the storage system 46 can include a front panel 56, a lid 58 a pair of lock mechanisms 60. The front panel 56 can extend in the transverse direction of the vehicle 10 from the left side trim panel assembly 44 to the right side trim panel.

Referring to FIGS. 2-4 collectively, the front panel 56 can include an outer surface 62 and a storage space 64 that is recessed from the outer surface 62 in the forward direction F. The outer surface 62 can face in the rearward direction R of the vehicle 10. The outer surface 62 can face the rear sill trim panel assembly 42. The storage space 64 can be configured to accommodate at least one of the fuel funnel, the pressurized sealant bottle, the air pump, the jack assembly, the wheel wrench and the bar jack.

Referring to FIGS. 4, 7, 9, 10 and 14 collectively, the front panel 56 can include an upper edge 66, a lower edge 68, a left edge 70 and a right edge 72. The upper and lower edges 66, 68 can form the upper and lower limits, respectively, of the storage space 64 in the vertical direction V of the vehicle 10. The left and right edges 70, 72 can form the left and right limits, respectively, of the storage space 64 in the transverse direction T of the vehicle 10.

The lid 58 can be selectively connected to and removed from the front panel 56 such that the lid 58 can selectively expose and cover the storage space 64 when the lid 58 is connected to the front panel 56. The lock mechanisms 60 can selectively lock and unlock the lid 58 to and from the front panel 56. Referring to FIG. 3, each lock mechanism 60 can include a lock 74. Referring to FIG. 4, each lock mechanism 60 can include a first keyhole 76 formed in the front panel 56. Referring FIG. 5 the lock mechanism 60 can include a second keyhole 78 formed in the lid 58.

Figure 17:
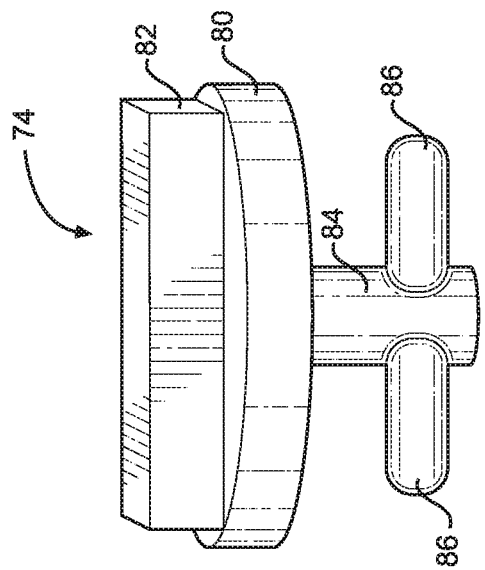
FIG. 17 is perspective view of a key for a lock mechanism of the storage system of FIG. 2.

Referring to FIG. 17, the lock 74 can include a flange 80, a grip 82, a stem 84 and a pair of locking arms 86. The locking arms 86 can be connected to and extend from the stem 84 and can be oriented to align with the grip 82.

Referring to FIG. 4, each of the keyholes 76, 78 can include a circular opening 88 and a pair of elongated openings 90 in communication with the circular opening 88. The lock 74 can pass through each of the keyholes 76, 78 when the locking arms 86 are aligned with the elongated openings 90. The lock 74 can be retained in the keyholes 76, 78 when the locking arms are rotated out of alignment with the elongated openings 90. The elongated openings 90 of the second keyhole 78 can be misaligned with the elongated openings 90 of the first keyhole 76 so that the lock 74 remains connected to the lid 58 when the lock 74 is rotated to the unlocked position with respect to the first keyhole 76.

Referring to FIG. 2, the vehicle 10 can include a cargo floor panel 92. The cargo floor panel 92 can extend in the transverse direction T of the vehicle 10 and between the left side trim panel assembly 44 and the right side trim panel assembly. The cargo floor panel 92 can extend in the longitudinal direction L of the vehicle 10 and between rear sill trim panel assembly 42 and the front panel 56. The cargo floor panel 92 can be formed from any appropriate material such as but not limited to plastic, metal, carbon fiber, fiber reinforced plastic, fiber glass, wood fiber board, or wood particle board. The cargo floor panel 92 can include a carpet or matting layered on top of a panel formed from any of the materials described above. The cargo floor panel 92 can be permanently fixed in the rear cargo space 32. Alternate embodiments can include a cargo floor panel 92 that is configured as the movable cover 40 described above.

The front panel 56 can include a channel 94 along the lower end of the front panel 56. The cargo floor panel 92 can extend into the channel 94 of the front panel 56. The front panel 56 can be positioned between the cargo floor panel 92 and the third seating row 28 in the longitudinal direction L of the vehicle 10.

The storage system 46 can include an upper panel 96 connected to the front panel 56 in any appropriate manner such as but not limited to mechanical fasteners, adhesives, or an interference fit between mating portion(s) of the front panel 56 can the upper panel 96. The upper panel 96 can extend along the top end of the front panel 56 in the transverse direction T of the vehicle 10. The upper panel 96 can extend away from the front panel 56 in the forward direction F of the vehicle 10. The upper panel 96 can extend from the front panel 56 to the rear side 48 of the seat backs 52, 54 in the longitudinal direction L of vehicle 10. The upper panel 96 can include a front end 98 that abuts the rear side 48 of the seat backs 52, 54 and a rear end 100 that extends along the front panel 56.

The storage system 46 can be adjacent, in the longitudinal direction L, to the pivot axis A of the third seating row 28.

Each of the seating rows 24, 26, 28 can include at least one seat. For example, the first seating row 24 can include a pair of seats that are spaced apart from each other in the transverse direction T of the vehicle and the second and third seating rows 26, 28 can include a single seat that can accommodate at least two passengers. Each of the seating rows 24, 26, and 28 can be permanently mounted to the floor 12 or removably mounted to the floor 12.

Referring to FIG. 4, the front panel 56 can have a main wall 57 and a storage compartment 59 in the storage space 64. The storage compartment 59 can include a bottle compartment 120, a pump compartment 130, and a funnel compartment 140. The pump compartment 130 can be located between the bottle compartment 120 and the funnel compartment 140.

Figure 7:
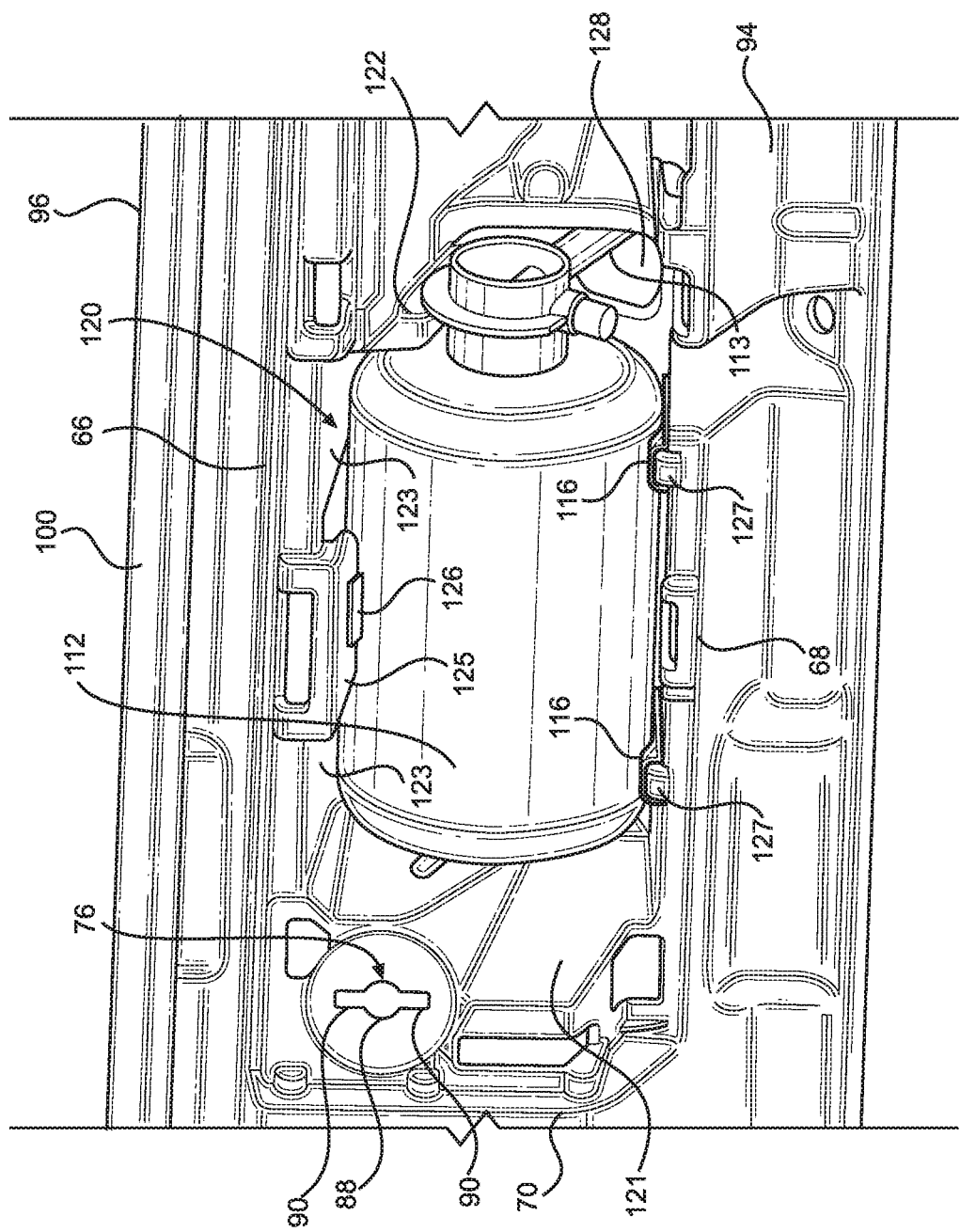
FIG. 7 is a partial perspective of a first portion or the storage system of FIG. 2 and the bottle of FIG. 6 placed in the storage system.
Figure 8:
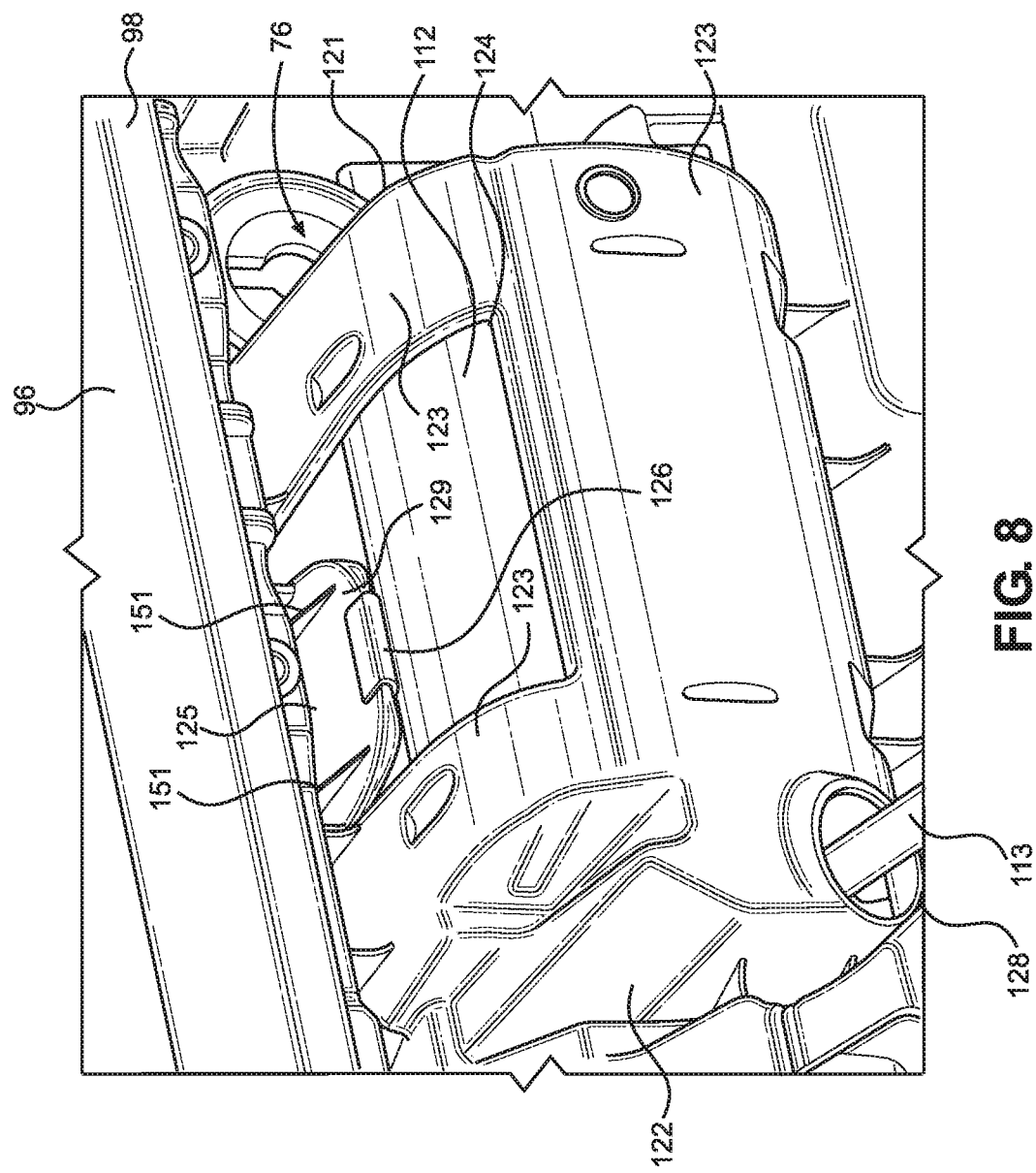
FIG. 8 is a partial perspective of the rear side of FIG. 7.

Referring to FIGS. 7 and 8, the bottle compartment 120 can have a first end wall 121 and a second end wall 122. The first and second end walls 121, 122 can extend in the longitudinal direction L and the transverse direction T. The first and second end walls 121, 122 can be spaced apart in the transverse direction T. The bottle compartment 120 can include a side wall 123 extends from and is attached to both the first and second end walls 121, 122. The side wall 123 can have a concave shape that is complimentary to the shape of a tool such as a bottle 112 described in further detail below. For example, the side wall 123 can have a curved portion that conforms to the curvature of the bottle 112.

The side wall 123 can include an aperture 124. The aperture 124 can be adjacent to the upper edge 66 of the front panel 56. The aperture 124 can be any appropriate shape such as but not limited to a generally rectangular shape. The aperture 124 can be located along a curved portion of the side wall 123.

Figure 9:
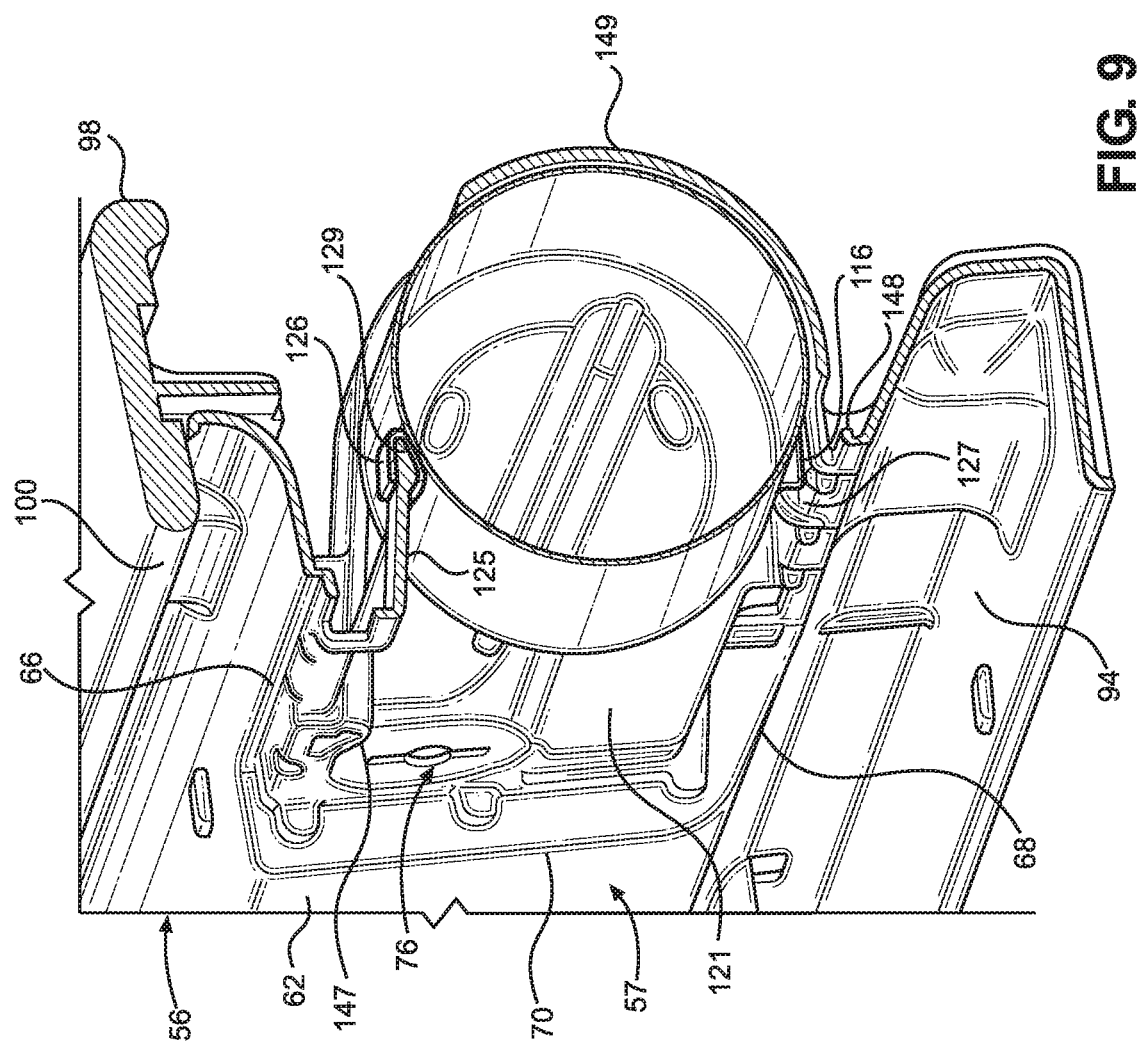
FIG. 9 is a perspective cross-sectional view taken along 9-9 of FIG. 4.

Referring to FIGS. 7-9, the storage compartment 57 can include a tab 125 mounted to the upper edge 66 of the front panel 56. The tab 125 can be cantilevered to the upper edge 66 such that a free end 129 of the tab 125 extends in the forward direction F. The free end 129 of the tab 125 can have a semicircular shape. The tab 125 can extend into or overlap with the aperture 124.

The free end 129 of the tab 125 can be located relative to an opposing portion of the side wall 123 such that the distance between the opposing portion of the side wall 123 and the free end 129 of the tab 125 is less than a corresponding dimension (for example, a diameter) of the bottle 112 so that the tab 125 can hold the bottle 112 in the bottle compartment 120. Thus, a user of the bottle 112 can move the lid 58 without holding onto or otherwise contacting the bottle 112. Further, the tab 125 can be configured to be elastically deformed by the bottle 112 as the bottle 112 is placed into or removed from the bottle compartment 120. The aperture 124 can be configured to accommodate the tab 125 when the bottle 112 elastically deforms the tab 125.

The tab 125 can include a fabric pad 126 attached to the free end 129 so that the fabric pad 126 contacts or opposes the bottle 112 when the bottle 112 is in the bottle compartment 120. The fabric pad 126 can be made from a soft material so that the fabric pad 126 can dampen noise created by the bottle sliding along or bumping against the tab 125. The fabric pad 126 can have any appropriate shape. The fabric pad 126 can be folded over the top edge of the tab 125 and extend on both sides of the tab 125. The portion of the fabric pad 126 that contacts the bottle 112 can be referred to as a touch-off point.

Referring to FIGS. 7 and 9, the side wall 123 can have two contact members 127. The contact members 127 can be referred to as bumps or as touch-offs. The contact members 127 can protrude from the side wall 123 in a general direction toward the tab 125. The two contact members 127 can extend from the lower edge 68 of the front panel 56 in the forward direction F. The two contact members 127 can be spaced a part in the transverse direction T. The contact members 127 can abut the bottle 112.

Each of the contact members 127 can include a fabric pad 116 that contacts the bottle 112 when the bottle 112 is in the bottle compartment 120. The portion of the fabric pad 116 that contacts the bottle 112 can be referred to as a touch-off point. The fabric pad 116 can be made from a soft material so that the fabric pad 116 can dampen noise created by the bottle sliding along or bumping against the contact members 127. The fabric pad 116 can have any appropriate shape.

Referring to FIG. 9, the side wall 123 can include a first end 147, a second end 148 and a concave wall portion. The first end 147 can be connected to the main wall 57 adjacent to the upper edge 66. The second end 148 can be connected to the main wall 57 along the lower edge 68. The concave wall portion 149 can extend from and be connected to each of the first end 147 and the second end 148.

Figure 6:
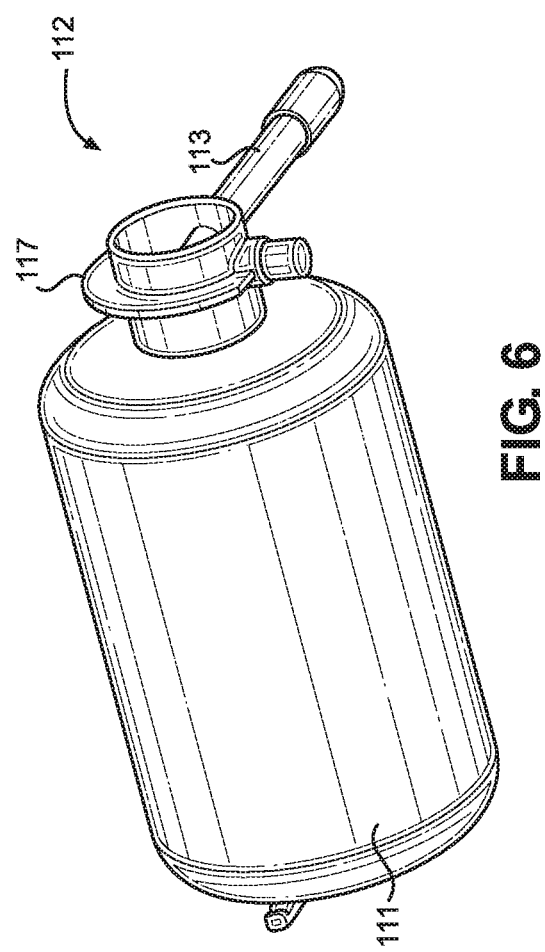
FIG. 6 is a perspective view of a bottle of a tire repair kit that can be stowed in the storage system of FIG. 2.

Referring to FIG. 6, the bottle 112 can include a main body 111, a bottle stem 113 and a cap 117. The bottle stem 113 can be connected to the cap 117 and the cap can be removably or permanently attached to the main body 111. The bottle stem 113 can have a cylindrical tube shape that extends from the cap 117 and is perpendicular to an axial direction of the bottle 112. The main body 111 can have a cylindrical shape.

Referring to FIGS. 7 and 8, the side wall 123 can have a stem hole 128. The stem hole 128 can be a circular shaped aperture. The stem hole 128 can be in the side wall 123 and adjacent to the second end wall 122. The stem hole 128 can have any appropriate shape that can accommodate the bottle stem 113. The second end wall 122 can be located between the stem hole 128 and the first end wall 121 with respect to the transverse direction T. The second end wall 122 can be closer to the stem hole 128 than to the first end wall 121 in the transverse direction T.

The bottle compartment 120 can receive the bottle 112. The bottle 112 can be orientated sideways in the bottle compartment 120 such that the axial direction of the main body 111 extends along the transverse T. The bottle 112 can fit between the first and second end walls 121, 122 and the side wall 123. The stem hole 128 can receive the bottle stem 113 of the bottle 112. The stem hole 128 allows the bottle stem 113 to extend through the side wall 123 of the bottle compartment 120.

Figure 10:
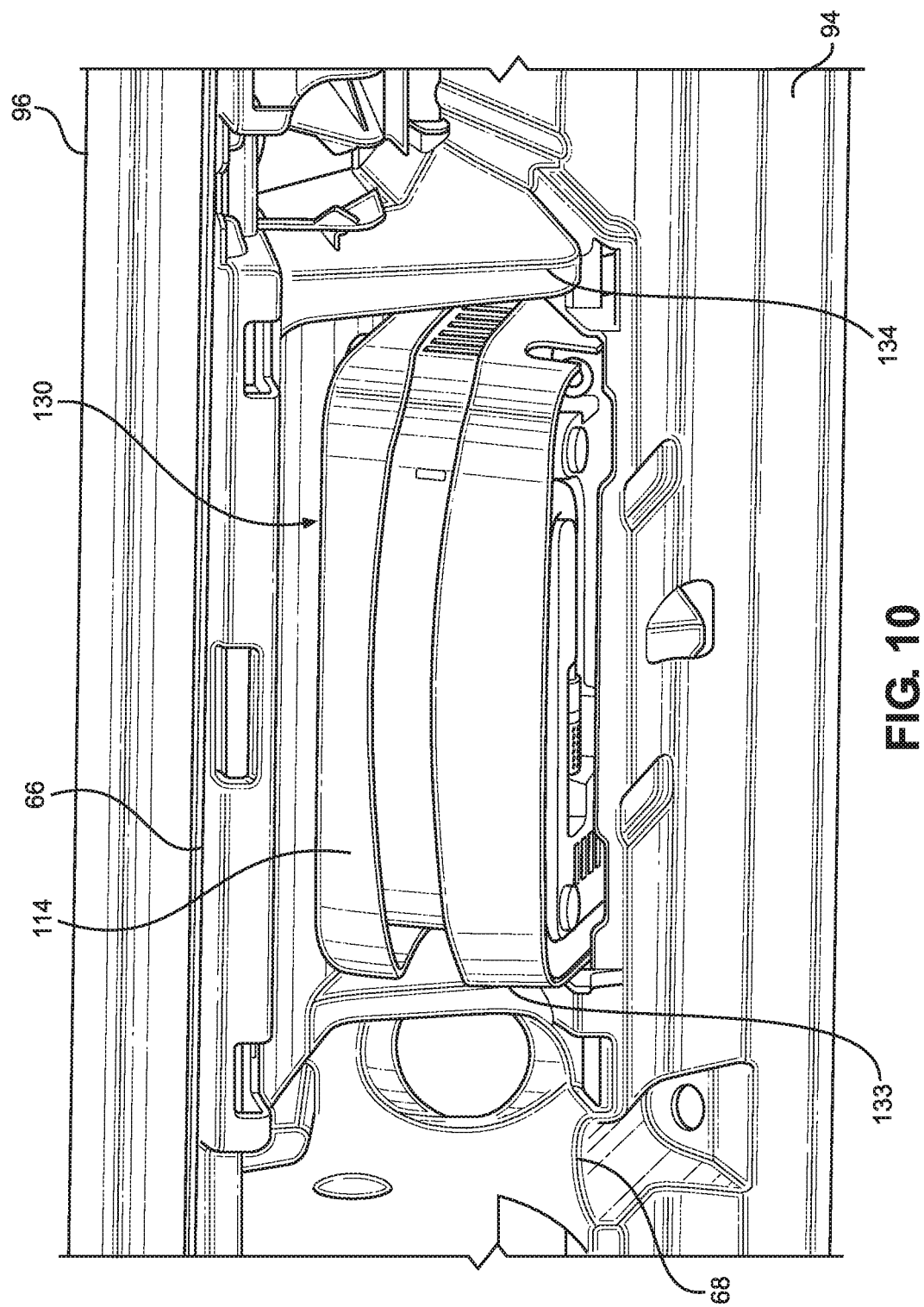
FIG. 10 is a partial perspective view of a second portion of the storage system of FIG. 2 and a pump of the tire repair kit placed in the storage system.
Figure 11:
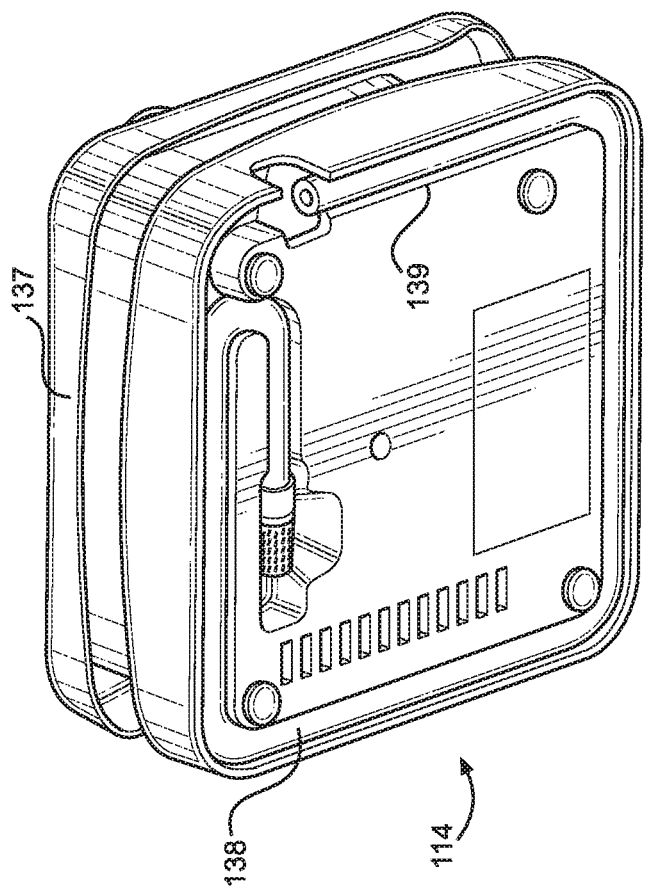
FIG. 11 is a bottom perspective view of the pump shown in FIG. 10.
Figure 12:
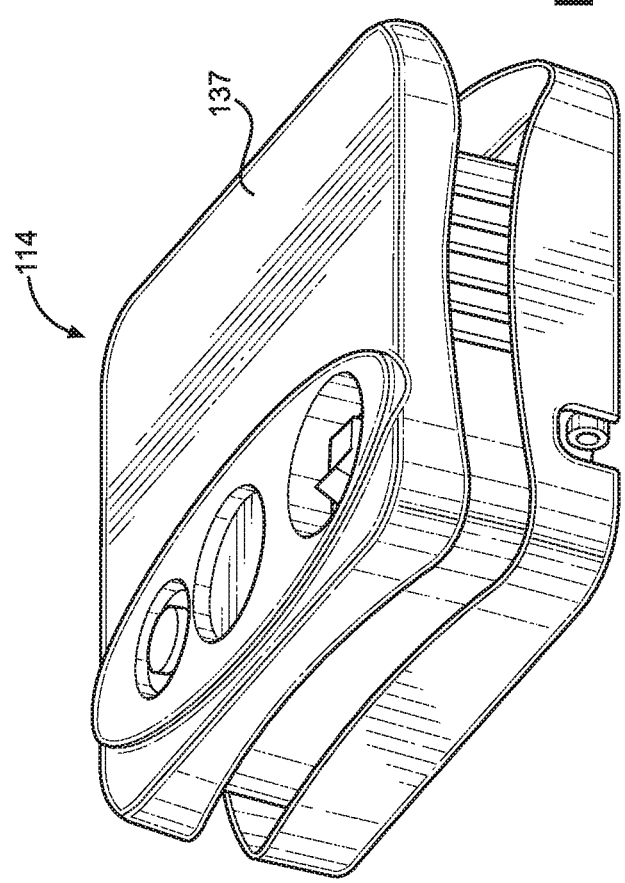
FIG. 12 is a top perspective view of the pump shown in FIG. 10.
Figure 13:
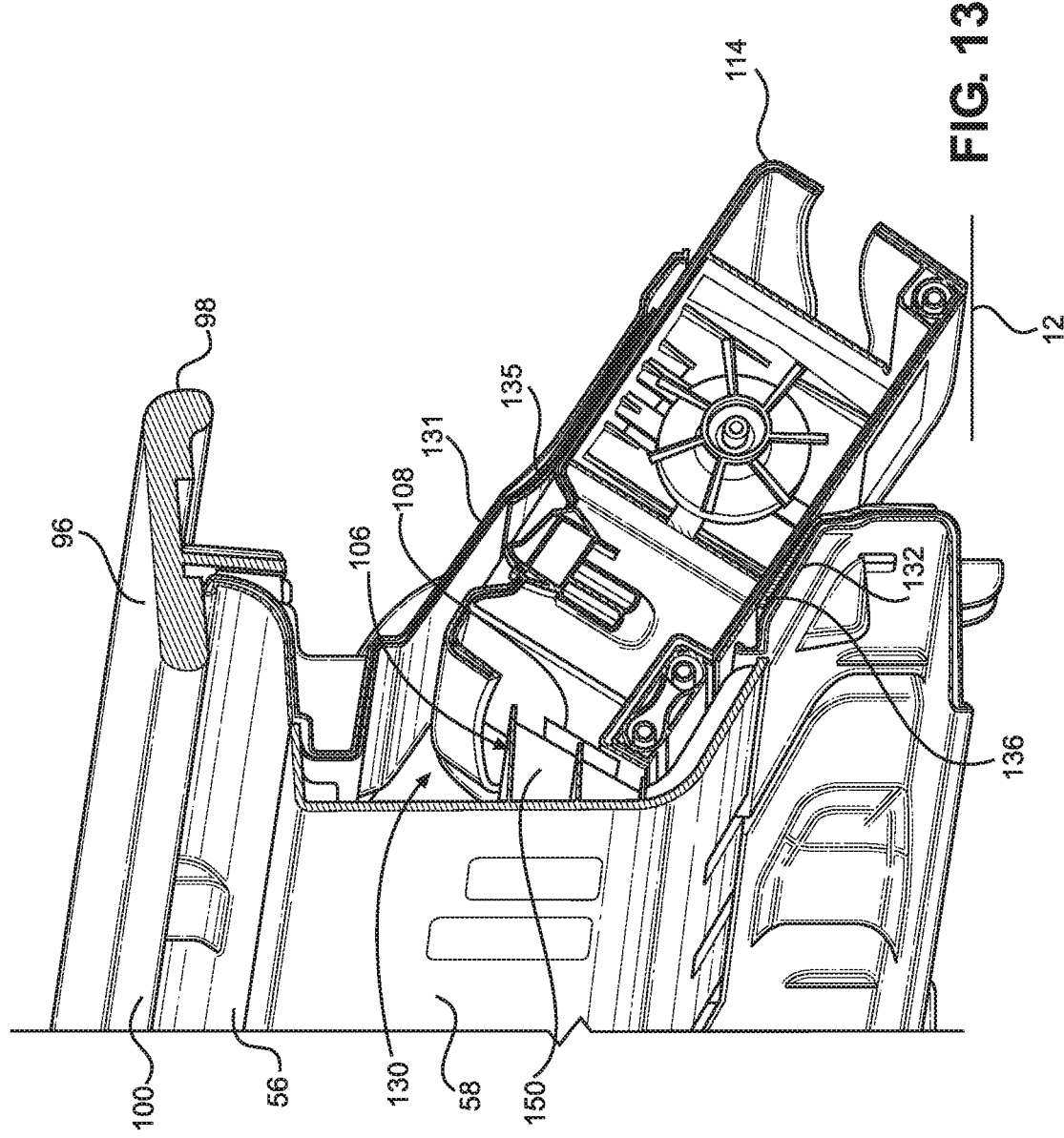
FIG. 13 is a perspective cross-sectional view taken along 13-13 of FIG. 4.

Referring to FIGS. 10 and 13, the pump compartment 130 can have a top wall 131 and a bottom wall 132. The top wall 131 can be attached to the upper edge 66 of the front panel 56 and extend away from the main wall 57 in the forward direction F and the vertical direction V. The bottom wall 132 can be attached to the lower edge 68 of the front panel 56 and extend away from the main wall 57 in the forward direction F and the vertical direction V. The bottom wall 132 can be parallel to or substantially parallel to the top wall 131 such that one skilled in the art would perceive the bottom wall 132 as being parallel to the top wall 131. The walls 131, 132 can be spaced apart in the longitudinal direction L and the vertical direction V. The walls 131, 132 can be inclined at an acute angle with respect to the floor 12 of the vehicle 10.

The pump compartment can include a first end wall 133 and a second end wall 134 are attached to both the top wall 131 and the bottom wall 132. The first and second end walls 133, 134 can be spaced a part in the transverse direction T. The end walls 133, 134, the top wall 131 and the bottom wall 132 form a cavity that is inclined relative to the floor 12 of the vehicle 10.

The top wall 131 can have a top fabric pad 135 attached to it. The bottom wall 132 can have a bottom fabric pad 136 attached to it. The fabric pads 135, 136 can be made from a soft material so that the fabric pads 135, 136 can dampen noise created by the pump 114 sliding along or bumping against the top and bottom walls 131, 132. The fabric pads 135, 136 can have any appropriate shape. The portion of the top wall that includes the fabric pad 135 and the portion of the bottom wall 132 that includes the fabric pad 136 can be referred to as a touch-off.

The pump 114 can have a housing 137 and a tube 138. The housing can have a generally cubic shape. The housing 137 can include a channel 139 recessed in the bottom of the housing 137. The tube 138 can be stored in the channel 139 when the pump 114 is located in the pump compartment 130.

The pump compartment 130 can receive the pump 114. The pump 114 can be placed in the cavity formed by the top wall 131, the bottom wall 132, the first end wall 133, and the second end wall 134. The top wall 131 and the bottom wall 132 can orientate the pump 114 at an acute angle with respect to the floor 12 of the vehicle 10. This inclination can be advantageous for limiting movement of the pump 114 within the pump compartment 130 during operation of the vehicle 10. The top fabric pad 135 and the bottom fabric pad 136 abut the top and bottom of the pump 114 when the pump 114 is located in the pump compartment 130.

Figure 15:
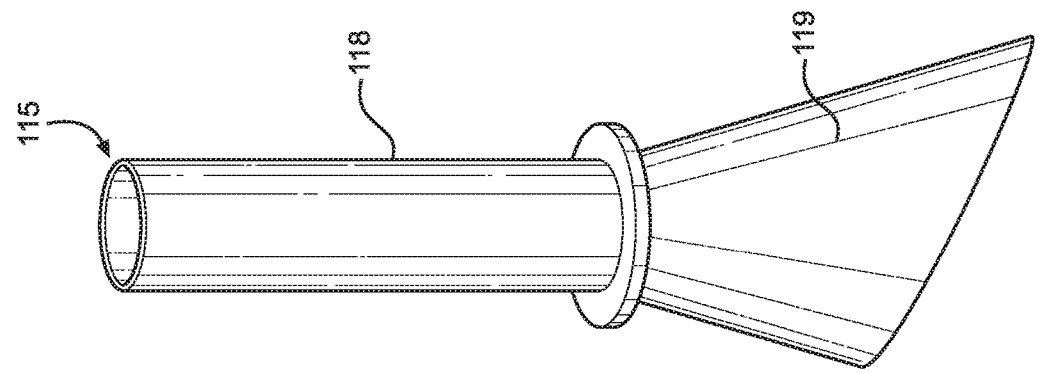
FIG. 15 is a perspective view of the funnel shown in FIG. 14.
Figure 14:
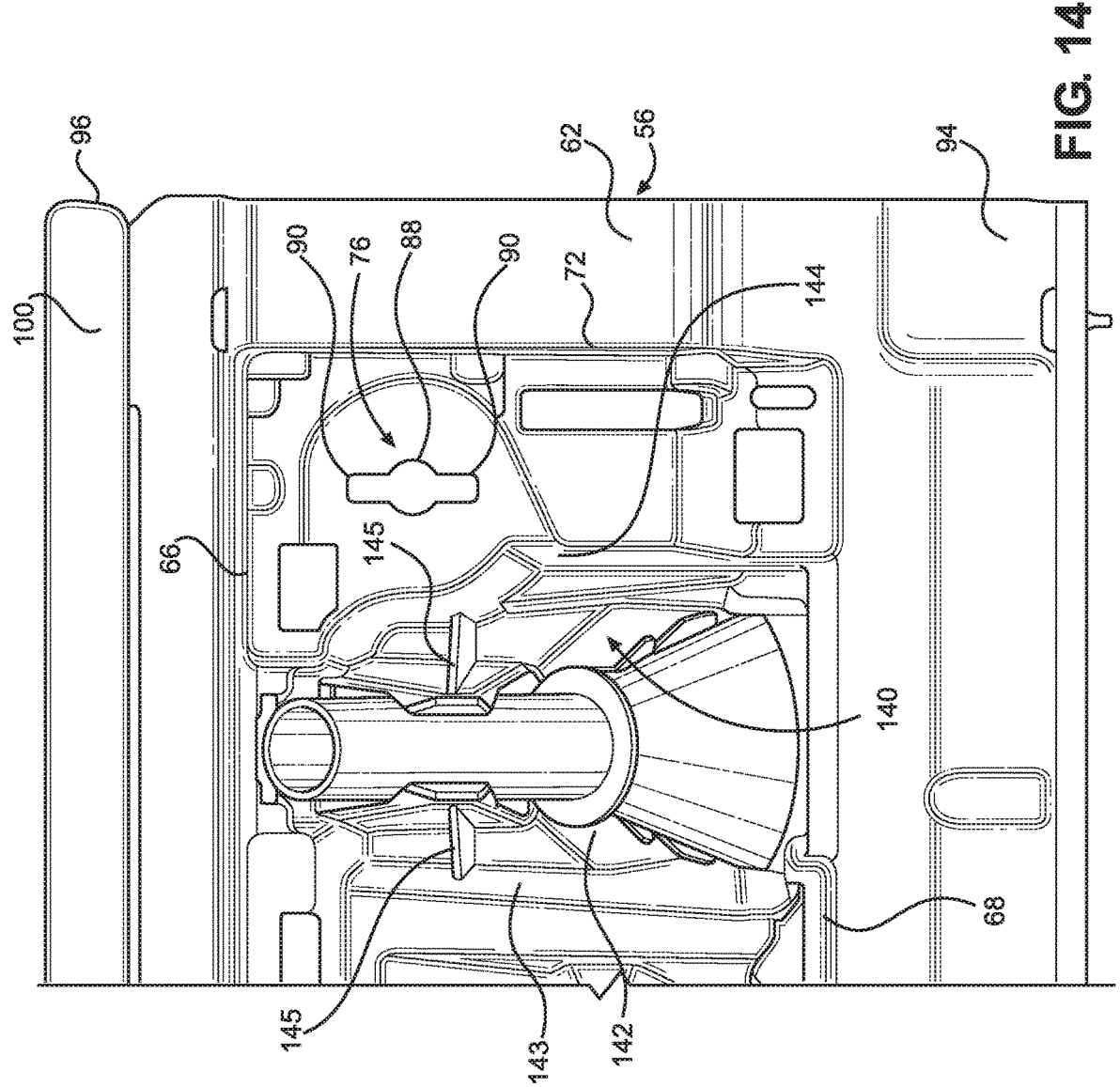
FIG. 14 is a perspective view of a third portion of the storage system of FIG. 2 and a funnel of the tire repair kit placed in the storage system.

Referring to FIGS. 14-16, the funnel compartment 140 can have a bottom wall 141, a side wall 142, a first end wall 143, and a second end wall 144. The bottom wall 141 is attached to the lower edge 68 of the front panel 56. The bottom wall 141 can be connected to and extend from the main wall 57 along the lower edge 68. The side wall 142 can be attached to and extend from both of the end walls 143, 144. The end walls 143, 144 can be connected to and extend from each of the bottom wall and the main wall 57 adjacent to the upper edge 66. The bottom wall 141, the side wall 142, and the end walls form a concave shape chamber configured to contain the funnel 115.

The funnel compartment 140 can have a pair of clip arms 145. Each clip arm 145 can extend from a respective one of the end walls 143, 144. The clip arms 145 can be configured to resiliently deflect when the funnel 115 is placed between and removed from between the clip arms 145. For example, the clip arms 145 can be cantilevered to the end walls 143, 144 and include free ends spaced apart by a distance that is less than a size of the a portion of the funnel 115 that is to be engaged by the clip arms 145. The clip arms 145 can have a trapezoidal shape.

The funnel compartment 140 can include a contact member 146. The contact member 146 can be referred to as a touch-off. The contact member 146 can protrude from the side wall 142 at a position that is between the bottom wall 141 and the clip arms 145.

Referring to FIG. 15, the funnel 115 can have a first tubular part 118 and a second tubular part 119 attached together. The tubular parts 118, 119 can be hollow. The second tubular part 119 has a greater diameter than the first tubular part 118. The free ends of the clip arms 145 can be spaced apart by a distance that is smaller than the diameter of the first tubular part 118.

Referring to FIGS. 14 and 16, the funnel compartment 140 can selectively receive the funnel 115. The funnel compartment 140 can orientate the funnel 115 at an acute angle about the vertical direction V. The pair of clip arms 145 can attach to the first tubular part 118 of the funnel 115. The contact member 146 can attach to the second tubular part 119 of the funnel 115. The lower end of the second tubular part can extend through an opening between the side wall 142 and the bottom wall 141.

Referring to FIG. 3, the lid 58 can include an outer surface 156. The outer surface 156 of the lid 58 can be complimentary to the outer surface of the front panel 56 such that the outer surfaces 62, 156. The outer surface 156 of the lid 58 can face the rear cargo space 32 and the rear sill trim panel assembly 42 in the rearward direction R.

Figure 5:
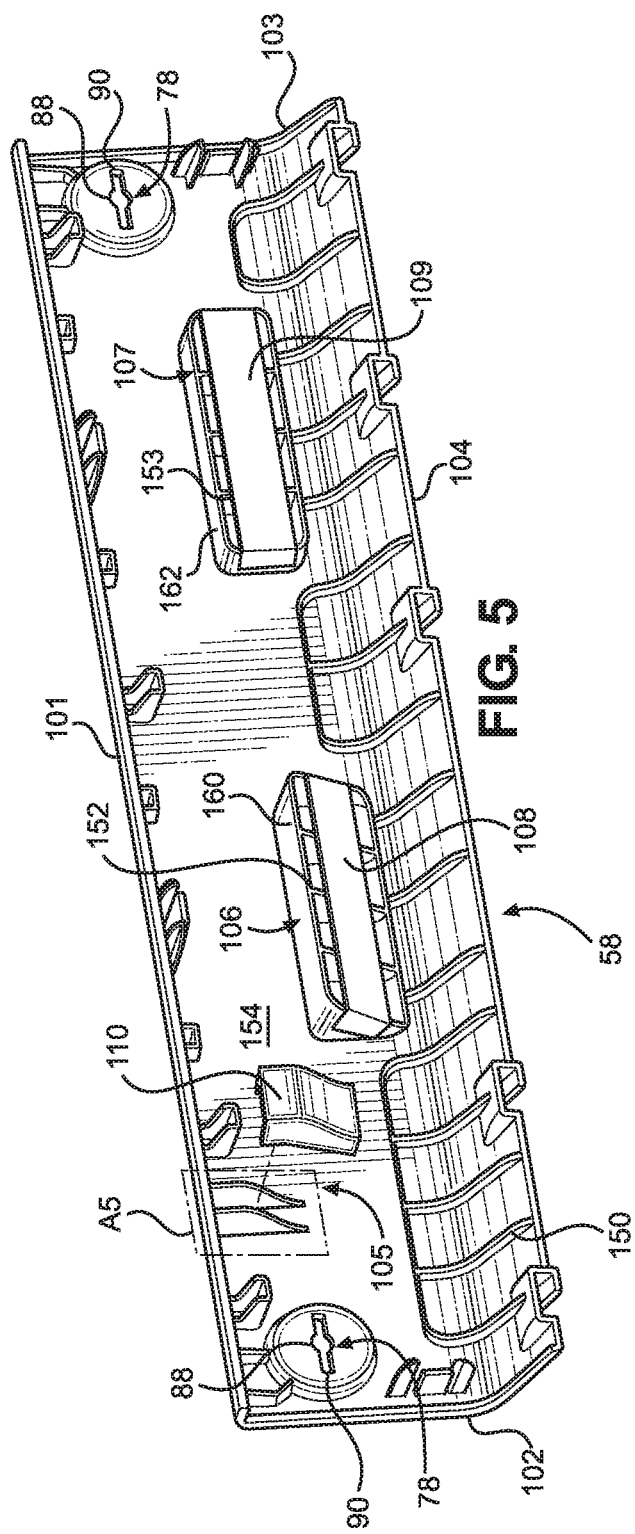
FIG. 5 is perspective view of a rear side of the lid of the storage system of FIG. 3.

Referring to FIG. 5, the lid 58 can have a top edge 101, a left edge 102, a right edge 103, a bottom edge 104, an inner surface 154, first contact member 105, a second contact member 106 and a third contact member 107. The inner and outer surfaces 154, 156 can extend from each of the edges 101, 102, 103, 104. The inner surface 154 can face toward the forward direction F when the lid 56 is connected to the front panel 56 and conceals the storage compartment 59. Each of the contact members 105, 106, 107 can be attached to and extend from the inner surface of the lid 58 in the forward direction F. The first contact member 105 can be adjacent to the top edge 101 and the first keyhole 76. The second and third contact members 106, 107 can be spaced apart from each other in the transverse direction T. The contact members 105, 106, 107 can be referred to as touch-offs.

Figure 18:
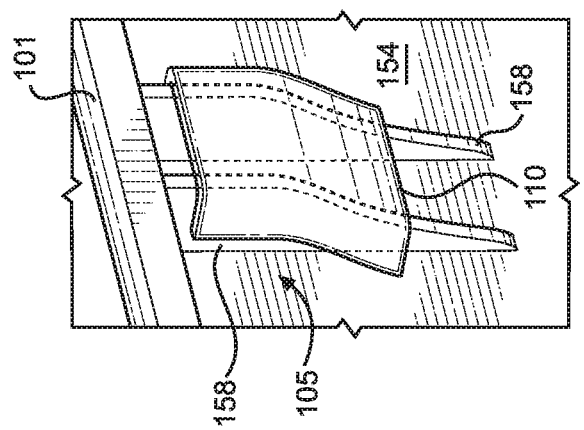
FIG. 18 is an enlarged view of area A5 of FIG. 5.

Referring to FIG. 16, the first contact member 105 can be configured to abut the funnel 115 when the funnel 115 is placed in the funnel compartment 140 and the lid 58 is connected to the front panel 56 and conceals the funnel compartment 140. Referring to FIG. 18, the first contact member 105 can include a pair of projections 158 and a fabric pad 110. The projections 158 can be space apart from each other by a space. The fabric pad 110 can be connected to the projections 158 and can span the space between the projections 158.

Referring to FIG. 13, second contact member 106 can be configured to abut the pump 114 when the pump 114 is placed in the pump compartment 130 and the lid 58 is connected to the front panel 56 and conceals the pump compartment 130. Referring to FIG. 5, the second contact member 106 can include a rectangular perimeter wall 160, a plurality of ribs 152 and a fabric pad 108. The perimeter wall 160 can encircle a space and the ribs 152 can be located in and span the space. The ribs 152 can be spaced apart from each other within the space. The fabric pad 108 can be attached to each of the ribs 152 and opposite side portions of the perimeter wall 160. The fabric pad 108 can span the space encircled by the perimeter wall 160 and be wrapped around the opposite side portions. The fabric pad 108 can have a rectangular shape.

The third contact member 107 can be configured to abut the bottle 112 when the bottle 112 is placed in the bottle compartment 120 and the lid 58 is connected to the front panel 56 and conceals the bottle compartment 120. Referring to FIG. 5, the third contact member 107 can include a rectangular perimeter wall 162, a plurality of ribs 153 and a fabric pad 109. The perimeter wall 162 can encircle a space and the ribs 153 can be located in and span the space. The ribs 153 can be spaced apart from each other within the space. The fabric pad 109 can be attached to each of the ribs 153 and opposite side portions of the perimeter wall 162. The fabric pad 109 can span the space encircled by the perimeter wall 162 and be wrapped around the opposite side portions. The fabric pad 109 can have a rectangular shape.

Each of the fabric pads 108, 109 can have a contact surface that faces away from and is spaced away from the inner surface 154 of the lid 58. The contact surface of the fabric pad 108 can lie in a plane that is at an angle to a plane in which the contact surface of the pad 109 lies. For example, the contact surface of the pad 109 can be parallel to or substantially parallel to the inner surface 154 of the lid 58 such that one skilled in the art would perceives the surfaces as being parallel to each other. The contact surface of the fabric pad 108 can be tilted toward the floor 12 of the vehicle 10 and at an acute angle with respect to the inner surface 154 of the lid 58.

A plurality of ribs 150 can extend along the inner surface of the lid 58 and away from the bottom edge 104 of the lid 58. The second and third contact members 106, 107 can be adjacent to the ribs 150. The ribs 150 can be located between the second and third contacting members 106, 107 and the bottom edge 104.

The panel 56 and the lid 58 can be made from any appropriate material such as but not limited to plastic, metal, or a composite of two or more different materials. FIGS. 2-5, 7-10, 13, 14 and 16 show a panel 56 and a lid 58 that can be molded from a plastic material. For example, the storage compartment 59 and each of the features of the storage compartment 59 described above can be integrally formed as a unitary, homogenous whole with the panel 56 during the molding of the panel 56. Further, the lid 58 and each of the features of the lid 58 described above can be integrally formed as a unitary, homogenous whole with the lid 58 during the molding of the lid 58. The integrated structure of each of the front panel 56 and the lid 58 can be advantageous for part cost, part count, weight, assembly time and ease of assembly of the storage system 46.

The fabrics pads 108, 109, 110, 126, 135, and 136 can be made from any appropriate material such as but not limited to felt, natural cloth, or synthetic cloth. Alternate embodiments of any of the pads 108, 109, 110, 126, 135, 136 can be made from a rubber material or an elastomeric material.

Accordingly, the storage system 46 can be configured to secure the tool(s) without the use of straps or other separate fasteners and without a separate foam insert yet still provide an advantageous level of noise suppression. Thus, the storage system 46 can reduce the part count and assembly time for manufacturing and installing the storage system 46 and can simplify securement and removal of the tool(s) from the storage system 46.

While certain embodiments of the invention are described above, it should be understood that the invention can be embodied and configured in many different ways without departing from the spirit and scope of the invention.

For example, embodiments are disclosed above in the context of three seating rows shown in FIG. 1 However, alternate embodiments of the vehicle can include a second seating row and a third seating row that are foldable and/or removable from the vehicle 10 such that an interior cargo space can be expand from the rear cargo space 32 to the second seating row or the first seating row. Further, alternate embodiments of the vehicle 10 can omit the third seating row 28 entirely such that the front end of the rear cargo space 32 is bound by the second seating row 26.

Exemplary embodiments can include a third seating row 28 (or a second seating row 26) that includes a left seat back 52 and a right seat back 54 that are equal in size to each other or that are different in size to each other. Exemplary embodiments can include a third seating row 28 (or a second seating row 26) that includes a single seat back that spans the entire seat bottom 50 along the transverse direction T of the vehicle 10. Alternate embodiments can include a third seating row 28 (or a second seating row 26) that includes a seat back that does not pivot relative to the seat bottom 50. Exemplary embodiments can include a third seating row 28 (or a second seating row 26) that includes a seat bottom 50 that can accommodate more than one passenger. Exemplary embodiments can include a third seating row 28 (or a second seating row 26) that includes a plurality of discrete seat bottoms that each accommodate only one passenger.

FIGS. 2 and 3 show two lock mechanisms 60. However, alternate embodiments can include any appropriate number of lock mechanisms, including a single lock mechanism 60. Further, alternate embodiments can replace the lock mechanism 60 with any other appropriate connection structure such as but not limited to threaded fasteners, resiliently deformable snap fasters, straps, hook and loop strips and any combination thereof.

The lid 58 is described above and illustrated in the drawings as being selectively detached from and attached to the front panel 56. However, exemplary embodiments can include any appropriate structure that can allow the lid to be selectively placed in a closed state and an opened state. For example, the storage system 46 can include at least one hinge that pivotally connects the lid 58 to the panel 58. In another exemplary embodiment, the storage system 46 can include at least one fastener on the panel 56 and at least one mating fastener on the lid 56 that snap-fit together. In another exemplary embodiment, the lid 58 can be press-fit into engagement with the panel 56.

Alternate embodiments can include the tab 125 configured to be elastically deformed by the bottle 112 while the bottle 112 is in the bottle compartment 120. The elastic restoring force in the tab 125 can apply a clamping force to the bottle 112 such that the bottle 112 firmly abuts against the side wall 123 and the tab 125. Thus, the bottle 112 can be clamped between the tab 125 and the side wall 123 and noise produced by movement of the bottle 112 in the bottle compartment 120 can be reduced or eliminated.

FIG. 1 shows seating rows 24, 26, 28. Each of the seating rows 24, 26, and 28 can be immovably fixed to the floor 12 or movably mounted to the floor 12, such as via rails.

Referring to FIG. 4, the pump compartment 130 can be located between the bottle and funnel compartment 120, 140. However, the arrangement of the compartments 120, 130, 140 can be switched.

The exemplary embodiment of the storage system 46 described above and shown in the drawing can be integrally formed by mold a plastic material into the structure of the panel 56 and the structure of the lid 58. However, exemplary embodiments can include a panel 56 that formed from two or components that are subsequently connected together in any appropriate manner. Exemplary embodiments can include a lid 58 that is formed from two or more components that are subsequently connected together in any appropriate manner.

Exemplary embodiments can include a storage compartment 59 that can accommodate more than three tools or less than three tools. Exemplary embodiments can include any shape, profile or other geometry for the storage compartment 59 such that the storage compartment can accommodate and the lid 58 can conceal the tool(s) contained in the storage system 46.

What is claimed is:

1. A storage system for a kit for a vehicle, the vehicle including a rear cargo space having a front end, a rear end, an opening at the rear end, and a closure selectively opening and closing the opening, the storage system comprising:
   a front panel located at the front end of the rear cargo space and including an outer surface facing the rear cargo space and a storage space recessed from the outer surface, and the storage space is configured to contain the kit; and
   a lid connected to the front panel such that the lid is selectively placed in a closed state and an opened state, the lid conceals the storage space from the rear cargo space when the lid is in the closed state, and the storage space is opened to the rear cargo space when the lid is in opened state, wherein
   the front panel includes a channel configured to receive a floor panel forming a portion of the rear cargo space, and the channel is opened toward the rear end of the rear cargo space.

2. The storage system according to claim 1, wherein the front panel includes,
   a main wall, and the outer surface is on the main wall, and
   a storage compartment connected to and recessed from the main wall, the storage compartment is in the storage space and configured to contain one of a bottle, a pump and a funnel of the kit, and
   the lid includes,
   a lid outer surface facing the rear cargo space and an inner surface facing the storage space when the lid is in the closed state, and the lid outer surface is complimentary to the outer surface of the front panel, and
   a lid contact member protruding from the inner surface and configured to engage the one of the bottle, the pump and the funnel when the storage compartment contains the one of the bottle, the pump, and the funnel and when the lid is in the closed state.

3. The storage system according to claim 2, wherein
the storage compartment is configured to contain the bottle and includes a first end wall, a second end wall, a first side wall, an aperture in the first side wall, and a tab extending along the aperture,
the first end wall is connected to and extends away from the main wall,
the first and second end walls are spaced apart from one another,
the first side wall extends from and is connected to each of the first and second end walls,
the first side wall includes first and second ends connected to the main wall and a concave wall portion that extends between the first and second ends,
the aperture extends from the first end and into the concave wall portion,
the tab is cantilevered to the first end and overlaps a part of the aperture, and
the tab is configured to engage the bottle such that the bottle resiliently deflects the tab toward the aperture as the bottle enters and exits the storage compartment.

4. The storage system according to claim 3, wherein the storage compartment includes two contact members spaced apart from each other and adjacent to the second end of the side wall, the contact members oppose the tab and extend along the concave wall portion, the contact members protrude from the concave wall portion toward the aperture, and the contact members are configured to engage the bottle when the storage compartment contains the bottle.

5. The storage system according to claim 4, wherein
the tab includes a free end that is configured to engage the bottle when the storage compartment contains the bottle,
the tab includes a fabric pad extending along the free end such that the fabric pad engages the bottle when the bottle is secured in the storage compartment,
each of the contact members includes a contact fabric pad that engages the bottle when the storage compartment contains the bottle, and
the lid contact member includes a fabric pad that is configured to engage the bottle when the storage compartment contains the bottle and the lid is in the closed state.

6. The storage system according to claim 3, wherein the concave wall portion includes a hole adjacent to the second end wall, and the hole is configured to receive a stem of the bottle when the storage compartment contains the bottle.

7. The storage system according to claim 2, wherein the storage compartment is inclined relative to a floor of the vehicle and configured to contain the pump of the kit.

8. The storage system according to claim 7, wherein the storage compartment includes,
a top wall connected to and extending away from the main wall,
a bottom wall connected to and extending away from the main wall, the bottom wall is spaced away from and substantially parallel to the top wall, and
two end walls connected to the top and bottom walls such that the top, bottom and end walls form a cavity that is inclined relative to the floor of the vehicle and configured to receive the pump when the storage compartment contains the pump.

9. The storage system according to claim 8, wherein
each of the top wall and the bottom wall includes a wall fabric pad that is configured to engage the pump when the second compartment contains the pump, and
the lid contact member includes a lid fabric pad that is configured to engage the pump when the compartment contains the pump and the lid is in the closed state.

10. The storage system according to claim 2, wherein the storage compartment is configured to contain the funnel and the storage compartment includes,
a bottom wall connected to and extending away from the main wall,
two end walls connected to and extending from each of the bottom wall and the main wall, and
a side wall connected to and extending from each of the end walls and spaced away from the bottom wall.

11. The storage system according to claim 10, wherein the storage compartment includes,
pair of clip arms, each of the clip arms extends away from a respective one of the end walls and is configured to receive a portion of the funnel therebetween, the clip arms are configured to resiliently deflect when the funnel is placed between and removed from between the clip arms,
a contact member protruding from the side wall at a position that is between the bottom wall and the clip arms.

12. The storage system according to claim 10, wherein the lid contact member includes,
a pair of projections that are separated from each other by a space, and
a fabric panel that is connected to the projects and spans the space.

13. The storage system according to claim 1, further comprising a locking mechanism that is configured to selectively lock the lid in the closed state and unlock the lid for placement in the opened state, the locking mechanism includes,
a first locking hole through the front panel and that includes a first center hole and a pair of first elongated holes that extend away from and are in communication with the center hole,
a second hole through the lid and that includes a second center hole and a pair of second elongated holes extend away from and in communication with the center hole, the second center hole is aligned with the first center hole when the lid is in the closed state, and the second elongated holes are misaligned with the first elongated holes when the lid is in the closed state, and
a key extending through the second locking hole, rotatably connected to the lid, and selectively extending through the first locking hole when the lid is in closed state.

14. An interior storage compartment for a vehicle, comprising:
a floor;
a pair of side walls extending away from the floor and extending along a longitudinal direction of the vehicle, and the side walls are spaced apart from each other in a transverse direction of the vehicle;
a rear wall connected to and extending from the side walls and extending along the floor in the transverse direction of the vehicle;
a rear cargo space formed by the rear wall, the floor and the side walls, and the rear cargo space has a rear end that is bounded by the rear wall and a front end that is spaced away from the rear wall in a longitudinal direction of the vehicle;
a front panel extending along the floor, located at the front end of the rear cargo space, and including, an outer surface facing the rear cargo space and spaced away from the rear wall in the longitudinal direction of the vehicle, and a storage space recessed from the outer surface;

a kit including at least one of a bottle, a pump and a funnel contained in the storage space; and a lid connected to the front panel such that the lid is selectively placed in a closed state and an opened state, the lid conceals the storage space from the rear cargo space when the lid is in the closed state, and the storage space is opened to the rear cargo space when the lid is in opened state, wherein the front panel includes a channel below the storage space, and the floor extends into the channel.

15. The interior storage compartment according to claim 14, wherein the front panel includes, a main wall, and the outer surface is on the main wall, and a first storage compartment connected to and recessed from the main wall, the first storage compartment is in the storage space and contains the bottle, a second storage compartment connected to and recessed from the main wall, the second storage compartment is in the storage space and contains the pump, and a third storage compartment connected to and recessed from the main wall, the third storage compartment is in the storage space and contains the funnel, and the lid includes, a lid outer surface facing the rear cargo space and an inner surface facing the storage space when the lid is in the closed state, and the lid outer surface is complimentary to the outer surface of the front panel, and a first lid contact member protruding from the inner surface and configured to engage the funnel when the lid is in the closed state, a second lid contact member protruding from the inner surface and configured to engage the pump when the lid is in the closed state, and a third lid contact member protruding from the inner surface and configured to engage the bottle when the lid is in the closed state.

16. The interior storage compartment according to claim 14, wherein the lid is selectively attachable to and detachable from the front panel such that the lid is in the closed state when the lid is attached to the front panel and the lid is in the opened state when the lid is detached from the front panel.

17. An interior compartment for a vehicle, comprising:

a floor;

a pair of side walls extending away from the floor and extending along a longitudinal direction of the vehicle, and the side walls are spaced apart from each other in a transverse direction of the vehicle;

a rear wall connected to and extending from the side walls and extending along the floor in the transverse direction of the vehicle;

a passenger seat mounted on the floor and spaced away from the rear wall in the longitudinal direction of the vehicle;

a rear cargo space formed by the floor, the passenger seat, the rear wall, and the side walls, and the rear cargo space includes a front end that is adjacent to the passenger seat and spaced away from the rear wall in the longitudinal direction of the vehicle;

a front panel extending along the floor, located at the front end of the rear cargo space, and including, an outer surface facing the rear cargo area and spaced away from the rear wall in the longitudinal direction of the vehicle, and a storage space recessed from the outer surface;

a kit including at least one of a bottle, a pump and a funnel contained in the storage space; and a lid selectively attachable to and detachable from the front panel such that the lid covers the storage area when the lid is attached to the front panel and the lid exposes the storage area when the lid is detached from the front panel, wherein the front panel includes a channel below the storage space, and the floor extends into the channel.

18. The interior compartment according to claim 17, wherein the passenger seat includes a seat bottom and a seat back pivotally connected to the seat bottom about a pivot axis, and the front panel is adjacent to and extends along the pivot axis.

* * * * *